United States Patent [19]

Keener et al.

[11] 3,943,229

[45] Mar. 9, 1976

[54] METHOD OF REMOVING IODINE AND COMPOUNDS THEREOF FROM GASEOUS EFFLUENTS

[75] Inventors: Ronald L. Keener, Camden, N.J.; Paul A. Kittle, Gardenville, Pa.

[73] Assignee: Rohm and Haas Company, Philadelphia, Pa.

[22] Filed: Nov. 30, 1973

[21] Appl. No.: 420,422

[52] U.S. Cl. .................... 423/240; 423/241; 55/71
[51] Int. Cl.² ........................................ B01D 53/34
[58] Field of Search ........... 423/240, 241, 245, 501, 423/503, 488; 210/38; 55/71; 260/2.1 E; 252/301.1 R, 301.1 WD

[56] References Cited

UNITED STATES PATENTS

| | | | |
|---|---|---|---|
| 2,077,298 | 5/1937 | Zelger | 423/503 |
| 3,700,610 | 10/1972 | Zabicky-Zissman | 260/2.1 E |

*Primary Examiner*—Earl C. Thomas

[57] ABSTRACT

Certain anion exchange resins containing substantial amounts of cross-linker are useful in the removal of iodine and compounds thereof from gaseous effluents.

15 Claims, No Drawings

METHOD OF REMOVING IODINE AND COMPOUNDS THEREOF FROM GASEOUS EFFLUENTS

This invention concerns a method for removing elemental iodine and iodide compounds from a gaseous phase containing such compounds by means of an anion exchange resin. More particularly, the invention concerns a method for removing radioactive alkyl iodide, hydrogen iodide as well as elemental iodine under high temperature and high relative humidity conditions.

It is known that activated carbon or impregnated activated carbon may, under certain conditions, be useful in removing iodine and iodide compounds from gases. It is also known that the capacity and removal efficiency of activated carbon for iodides, in particular alkyl iodide, leaves much to be desired, particularly if the relative humidity of the gaseous phase much exceeds 70%. High temperatures such as in the range of 150°C. also effect the ability of carbon to adsorb iodide compounds as well as molecular iodine.

The prevention of airborne contamination is fundamental to the safe and economical operation of nuclear facilities. Although the health and safety of plant personnel and the public are primary, the high cost of decontamination in the event of an accidental release of radioactive material and the possibility of extended or even permanent shut-down of the facilities are also important considerations. Radioactive substances, even in extremely low concentrations by weight or volume, represent a hazard to human health and must be closely controlled. These problems are of particular concern in reactors and nuclear fuel reprocessing plants because of their potential for releasing a very large amount of radioactive material in the event of a system malfunction or accident, and they will become even more important as such plants become larger, more numerous, and sited closer to high density population areas.

Volatile radioactive alkyl iodide compounds, consisting mainly of methyl iodide, are evolved from the reactor core of nuclear facilities into the atmosphere, if not trapped by adsorbents. It can, therefore, be appreciated that an urgent need exists for adsorbents which will remove iodine and related compounds from gaseous effluents when one considers that these compounds are present during the operation of nuclear reactors and other devices in nuclear industry.

The extraordinary hazard caused by the potential release of such radioactive compounds particularly under accident conditions has resulted in increased environmental pressures on the Atomic Energy Commission to encourage further research in achieving zero radioactive leakage from nuclear facilities and power plants as well as fuel processing plants under all foreseeable conditions.

The conditions under which a radio-iodine adsorbent must operate will depend in part on the type of nuclear power facility and to a larger extent on the particular gas stream being treated. Normally, off-gas streams from nuclear reactors are low-temperature, such as less than 100°C., low-humidity, and low-radioactivity. Such streams, it is generally understood, may satisfactorily be treated with impregnated carbons. However due to the potential danger to the environment caused by the presence of quantities of fission products, federal regulations require that such adsorbents also be capable of performing efficiently under the extreme conditions which would exist in the event of a major nuclear accident, defined as Design Basis Accident (DBA) conditions. Each nuclear power plant facility will have, of course, its own unique DBA conditions. In general, however, such adsorbents must be capable of performing efficiently over a wide range of temperatures and humidities and should be able to withstand sudden pressure surges. The range of temperature comtemplated is generally understood to be up to 180°C. and humidities of up to 100% are clearly within the realm of foreseeable conditions. However, the adsorbents should retain the adsorbed species under DBA conditons and should not undergo auto-ignition due to heat of decay of adsorbed species.

Accordingly it is an objective of this invention to provide a process which will remove elemental iodine and compounds thereof in a safe and dependable manner.

It is a further objective of the invention to remove such compounds under conditions of relative humidity ranging from 0 to 100%.

Additionally, it is an objective to operate the process at temperatures ranging up to approximately 180°C.

It is a further objective to provide a method utilizing a resin which will work effectively in a dry state.

It is another objective to provide a process which utilzes adsorbents having low attrition rate or loss.

It is a further objective to provide a method which utilizes a resin which is thermally stable at elevated temperatures.

It is an additional objective to provide a system which has a high capacity for elemental iodine as well as iodine compounds and a high retention capacity under severe temperature and moisture conditions. It is a further objective to provide a gaseous effluent purification system which has a high impurity removal efficiency during short residence time conditions.

Although a considerable portion of the prior art concerns the use of activated impregnated carbon systems, significant doubts exist as to the actual effectiveness of these systems under DBA conditions. Activated carbon systems perform best under low humidities and low thermal conditions. Particularly, methyl iodide adsorption efficiency decreases drastically with increased humidity. Some thought has been given to the use of weak base anion exchange resins for the removal of radioactive iodide compounds. Japanes Patent application No. 42-52857 filed Aug. 17, 1967, discloses the use of weak base anion exchange resin alone or in conjunction with strong gase resin for the removal of the iodine species. This reference discloses the use of an aromatic commercial resin, Amberlite IRA-93, available from the Rohm and Haas Company as being particularly useful for this purpose. Tests indicate however that such a resin has a very low thermal stability. For example, the reference suggests that the weak base MR type resin should be used only at temperatures below 100°C. Further, in the treatment of gaseous effluents it is preferred to keep the resin wet by the injection of demineralized water.

A more recent German patent application No. 2,103,431 of Jan. 26, 1971, suggests the use of a styrene-divinylbenzene (DVB) amino type anion exchange resin for the removal of radioiodine species from gaseous streams.

During laboratory studies of this resin it was found that a weak base amino resin utilizing a styrene-DVB matrix does efficiently remove methyl iodide at room temperature from an 86% relative humidity (RH) gaseous stream but that both the resin and the methyl iodide loaded resin underwent thermal degradation at a temperature of 114°C. It was additionally discovered that increasing the amount of crosslinker in the styrene-DVB resin did not result in an improvement of its properties and indeed caused a lower efficiency for methyl iodide while maintaining its vulnerablility to thermal degradation at 114°C.

Accordingly it is believed that such aromatic ion exchange resins of the benzylamine type have no utility in radioiodide species removal at elevated temperatures and that in any removal capability may decrease with the increase of crosslinker content.

It has now been surprisingly discovered that an acrylic anion exchange resin containing a substantial portion of crosslinking monomer(s) will effectively remove both elemental iodine as well as iodide compounds such as alkyl iodide at elevated temperatures and high moisture conditions from gaseous streams.

Additionally it has been discovered that high flow rates of 100 to 300 bed volumes per minute resulting in shorter resident times do not significantly affect the capacity and efficiency of the resin.

The resin useful in the process of the present invention preferably comprises an acrylic backbone formed by the suspension polymerization of a mixture of an acrylic and a crosslinking monomer.

Suitable acrylic monomers may include alkyl acrylate esters in which the alkyl group may contain from 1 to 6 carbon atoms and in which the alkyl groups containing more than 3 carbon atoms may be straight chain or branched alkyl groups. A preferred acrylate ester would be methyl acrylate. Substituted alkyl acrylate esters such as 2-hydroxyethyl acrylate and aromatic acrylate esters such as phenyl or benzyl acrylate may also be suitable acrylate monomers. The acrylic backbone may also be prepared in certain cases from acrylic acid, acrylate salts, acryloyl halides, acrylonitrile or acrylamide derivatives. Suitable crosslinking monomers may include divinylbenzene, ethyleneglycoldivinyl ether, diethyleneglycoldivinyl ether, trimethylolpropane trimethacrylate, 1,4-propanediol divinyl ether and similar compounds known to skilled workers in the art which contain two or more reactive unsaturated carbon-carbon bonds.

A preferred crosslinking monomer comprises a mixture of DVB and diethyleneglycoldivinyl ether (DEGDVE) or 1,4-propanediol divinyl ether. Suspension polymerizations of such monomer mixtures are well known to the skilled worker in the art. The resins may be prepared by reacting the copolymer obtained by suspension polymerization with a polyamino compound, for example, demethylaminopropylamine. As long as one of the amine groups of the polyamino compounds contains a replaceable hydrogen, no further restriction to the polyamino compound applies. The aforementioned suspension polymerization preferably includes the use of a phase extender such a diisobutyl ketone, since it is desirable to obtain polymers having macroreticular characteristics. Suitable polyamino compounds may include N,N-dimethylaminopropylamine, N,N-dimethylaminoethylamine, ethylene diamine, diethylenetriamine, triethylenetetraamine and N-substituted alkyl derivatives thereof.

The crosslinking monomer or monomer system should comprise at least 16% and preferably at least 20% of total monomer mix. If diethyleneglycoldivinyl ether is employed in the monomer mix, it is advisable that it is present in an amount of at least 4 to 5% by weight of total monomer mix. Additionally, it is suggested that the divinylbenzene should be applied in a form having at least 50% purity.

It was further discovered that the efficiency of the resin for methyl iodide removal from a high humidity gaseous effluent may be further improved by the replacement of a portion of the polyamino compound with a long chain monofunctional compound such as n-octyl amine. Other such monofunctional compounds will occur to the skilled worker in the art.

For the purpose of illustration the synthesis of a resin suitable for the practice of the invention is described in the following example.

EXAMPLE 1

A three-neck 3 l. round-bottom flask is equipped with a SS paddle, thermometer, reflux condenser and $N_2$ inlet. The thermometer is attached to a thermowatch-pot lifter-heating mantle assembly. To the stirred reactor is added a solution of 12 g. of Amberlite W-1, 0.08 g. of Pharmagel (Kind and Knox Gelatin Co.'s trademark for gelatin), 0.24 sodium nitrite and 24 g. of sodium chloride in 800 g. of deionized water. The solution is adjusted to pH 9 with NaOH and to this stirred solution is added the monomer phase containing 269 g. of methyl acrylate, 187 g. of DVB (51.3% assay) solution, 24 g. of DEGDVE, 4.8 g. of lauroyl peroxide and 320 g. of diisobutyl ketone (DIBK). The resultant mixture is agitated and gradually heated to 65°C. and held at that temperature with agitation for ca. 20 hrs. At the end of this time, the DIBK is removed via distillation and the batch is subsequently cooled to room temperature and washed with water until the effluent is clear. The resin is then oven dried to afford 449 g. of white, spherical beads.

250 g. of the beads from above and 1215 g. of dimethylaminopropylamine are charged to a 2-l.SS Parr bomb equipped with a thermometer, variac, heating mantle, pressure gauge, vent valve and water cooled stirrer. The bomb is sealed and the contents heated at 175°C. with agitation overnight. The bomb is subsequently cooled, the excess amine is siphoned from the beads and the beads are washed with water until the effluent is neutral. The beads are then dried to afford 269 g. of off-white beads.

The resins useful in the practice of the present invention were tested in a dry state and showed capacities for methyl iodide which were significantly superior to capacities of activated carbon under high thermal conditions, high relative humidities, and high concentrate influents.

The resin of Example 1 was analyzed with the help of a differential thermal analyzer and a thermal gravimetric analyzer and it was discovered that no significant decompositon occured up to 200°C. Similar analyses of the resins loaded with elemental iodine and methyl iodide showed no significant decomposition at temperatures up to 180°C.

Although weak base acrylic resins were found to be particularly suitable in the practice of the present invention, strong anion exchange resins, provided they are acrylic, may under certain conditions perform equally well. It has also been discovered that a weak base resin treated with methyl iodide can have increased performance characteristics which may be attributable to formation of some quaternary ammonium groups. For example the weak base resin of Example 1 in wet condition when subjected to a flow of $CH_3I$ stream indicates a substantial increase in capacity when subsequently tested in dry state for methyl iodide removal. Other acrylic resin structures such as hybrid resins are also contemplated to be within the scope of the invention.

We claim:

1. A method for removing iodine and compounds thereof from gaseous streams which comprises contacting the stream with a mass or bed of crosslinked acrylic anion exchange resin, derived from at least one acrylic monomer selected from the group consisting of branched and straight chain alkyl acrylate esters containing 1 to 6 carbon atoms, substituted alkyl acrylate esters, aromatic acrylate esters, acrylic acid, acrylate salts, acryloyl halides, acrylonitrile derivatives and acrylamide derivatives, and at least one crosslinking monomer, containing two or more reactive unsaturated carbon-carbon bonds.

2. Method of claim 1 wherein the iodine compounds are radioactive.

3. Method of claim 2 wherein the iodine compounds include alkyl iodides.

4. Method of claim 2 wherein the iodine compounds include hydrogen iodide.

5. Method of claim 2 wherein the iodine compounds include elemental iodine.

6. Method according to claim 2 wherein the process temperature exceeds 100°C. and the relative humidity is in the range of 0 – 100%.

7. Method according to claim 2 wherein the resin is utilized in its dry state.

8. Method according to claim 2 wherein the crosslinking monomers of the resin are present in a total amount of not less than 20% by weight of total monomer mix.

9. Method according to claim 2 wherein the crosslinking monomer contains diethyleneglycoldivinyl ether.

10. Method of claim 1 wherein the resin is a weak base ion exchange resin derived from a methyl acrylate copolymer matrix.

11. Method according to claim 2 wherein the resin comprises a copolymerized and functionalized mixture of methyl acrylate, divinylbenzene and diethyleneglycoldivinyl ether.

12. Method according to claim 11 wherein the cross linker monomer mixture comprises about 20% divinylbenzene, and about 5% diethyleneglycoldivinyl ether of total monomer mixture.

13. Method according to claim 2 wherein the resin is produced by aminolyzing an acrylic copolymer by reacting it with a polyamine or a mixture of polyamine and a long chain monofunctional amine.

14. Method according to claim 13 wherein the long chain monofunctional amine is n-octylamine.

15. Method according to claim 13 wherein the polyamine compound is dimethylaminopropylamine.

* * * * *